US011443619B2

(12) United States Patent
Suzuki et al.

(10) Patent No.: US 11,443,619 B2
(45) Date of Patent: Sep. 13, 2022

(54) VEHICLE RECOGNITION APPARATUS AND VEHICLE RECOGNITION METHOD

(71) Applicants: KABUSHIKI KAISHA TOSHIBA, Minato-ku (JP); TOSHIBA INFRASTRUCTURE SYSTEMS & SOLUTIONS CORPORATION, Kawasaki (JP)

(72) Inventors: Yoshihiko Suzuki, Suginami (JP); Toshio Sato, Yokohama (JP); Yusuke Takahashi, Tama (JP); Hideki Ueno, Urayasu (JP)

(73) Assignees: KABUSHIKI KAISHA TOSHIBA, Minato-ku (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 810 days.

(21) Appl. No.: 16/395,309

(22) Filed: Apr. 26, 2019

(65) Prior Publication Data
US 2019/0355246 A1    Nov. 21, 2019

(30) Foreign Application Priority Data

May 15, 2018  (JP) .............................. JP2018-093969
Jan. 11, 2019  (JP) .............................. JP2019-003619

(51) Int. Cl.
*G06T 7/11* (2017.01)
*G06T 7/174* (2017.01)
(Continued)

(52) U.S. Cl.
CPC .............. *G08G 1/0175* (2013.01); *G06T 7/11* (2017.01); *G06T 7/174* (2017.01)

(58) Field of Classification Search
None
See application file for complete search history.

(56) References Cited

U.S. PATENT DOCUMENTS 9,230,165 B2 *  1/2016  Guan ..................... G06V 20/58
11,302,012 B2 *  4/2022  Kalra ..................... G06V 10/60
(Continued)

FOREIGN PATENT DOCUMENTS

JP   2011-192177    9/2011
JP   2014-225220    12/2014
(Continued)

OTHER PUBLICATIONS

Nakai et al., "A Practical Stereo Scheme for Obstacle Detection in Automotive Use," Proceedings of the 17th International Conference on Pattern Recognition (ICPR'04) (Year: 2004).*

*Primary Examiner* — Soo Shin
(74) *Attorney, Agent, or Firm* — Oblon, McClelland, Maier & Neustadt, L.L.P.

(57) ABSTRACT

A vehicle recognition apparatus according to an embodiment includes one or more hardware processors to: acquire a photographed image obtained by photographing vehicles forming a column of vehicles from an obliquely rearward direction with respect to the column of vehicles; generate a parallax image based on the photographed image; estimate a vanishing point in the parallax image; generate strip regions by dividing a region below the vanishing point in the parallax image in a horizontal direction; calculate a representative parallax for each strip region; extract strip regions efficient in recognizing a vehicle from among the strip regions based on the representative parallax; couple strip regions adjacent to each other among the extract strip regions to generate a coupled strip region based on a distance distribution model of a back surface and a side (Continued)

surface of a vehicle; and recognize a vehicle based on the coupled strip region.

20 Claims, 18 Drawing Sheets

(51) Int. Cl.
*G06V 20/58* (2022.01)
*G08G 1/017* (2006.01)

(56) References Cited

U.S. PATENT DOCUMENTS

| | | | |
|---|---|---|---|
| 11,313,685 B2* | 4/2022 | Cheng | B64C 39/024 |
| 2006/0239509 A1* | 10/2006 | Saito | G06V 20/588 |
| | | | 701/1 |
| 2007/0233386 A1* | 10/2007 | Saito | G08G 1/165 |
| | | | 701/117 |
| 2009/0243823 A1* | 10/2009 | Takahashi | H04N 13/246 |
| | | | 348/47 |
| 2016/0304098 A1* | 10/2016 | Ito | B60W 40/076 |
| 2017/0124725 A1* | 5/2017 | Sumiyoshi | H04N 13/239 |
| 2018/0374345 A1 | 12/2018 | Suzuki et al. | |
| 2019/0355246 A1* | 11/2019 | Suzuki | G06T 7/174 |
| 2020/0184233 A1* | 6/2020 | Berberian | G06T 7/74 |
| 2022/0066456 A1* | 3/2022 | Ebrahimi Afrouzi | A47L 9/30 |

FOREIGN PATENT DOCUMENTS

| | | |
|---|---|---|
| JP | 2016-151887 | 8/2016 |
| JP | 2017-068712 | 4/2017 |
| JP | 6173791 | 8/2017 |
| JP | 2019-008433 | 1/2019 |

\* cited by examiner

STRIP REGION

STRIP REGION

STRIP REGION

| STRIP REGION No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| REPRESENTATIVE PARALLAX | 16 | 22 | 22 | 53 | 81 | 12 | 100 | 99 | 80 | 83 | 83 | 81 | 80 | 80 | 69 | 66 | 71 | 67 | 53 | 52 | 53 | 47 | 46 | 30 | 29 | 24 | 19 | 19 | 18 | 62 |
| DISTANCE [m] | 23.8 | 17.3 | 17.3 | 7.19 | 4.7 | 31.8 | 3.81 | 3.85 | 4.76 | 4.59 | 4.59 | 4.7 | 4.76 | 4.76 | 5.52 | 5.77 | 5.37 | 5.69 | 7.19 | 7.33 | 7.19 | 8.11 | 8.28 | 12.7 | 13.1 | 15.9 | 20.1 | 20.1 | 21.2 | 6.14 |

(b)

| STRIP REGION No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| REPRESENTATIVE PARALLAX | 16 | 22 | 22 | 53 | 81 | 12 | 100 | 99 | 80 | 83 | 83 | 81 | 80 | 80 | 69 | 66 | 71 | 67 | 53 | 52 | 53 | 47 | 46 | 30 | 29 | 24 | 19 | 19 | 18 | 62 |
| DISTANCE [m] | 23.8 | 17.3 | 17.3 | 7.19 | 4.7 | 31.8 | 3.81 | 3.85 | 4.76 | 4.59 | 4.59 | 4.7 | 4.76 | 4.76 | 5.52 | 5.77 | 5.37 | 5.69 | 7.19 | 7.33 | 7.19 | 8.11 | 8.28 | 12.7 | 13.1 | 15.9 | 20.1 | 20.1 | 21.2 | 6.14 |
| DISTANCE DIFFERENCE [m] | -6.5 | 0 | 0 | -10 | -2.5 | 27.1 | -28 | 0.04 | 0.91 | -0.2 | 0 | 0.11 | 0.06 | 0 | 0.76 | 0.25 | -0.4 | 0.32 | 1.5 | 0.14 | -0.1 | 0.92 | 0.17 | 4.42 | 0.44 | 2.73 | 4.18 | 0 | 1.11 | -15 |

(c)

| STRIP REGION No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| REPRESENTATIVE PARALLAX | 16 | 22 | 22 | 53 | 81 | 12 | 100 | 99 | 80 | 83 | 83 | 81 | 80 | 80 | 69 | 66 | 71 | 67 | 53 | 52 | 53 | 47 | 46 | 30 | 29 | 24 | 19 | 19 | 18 | 62 |
| DISTANCE [m] | 23.8 | 17.3 | 17.3 | 7.19 | 4.7 | 31.8 | 3.81 | 3.85 | 4.76 | 4.59 | 4.59 | 4.7 | 4.76 | 4.76 | 5.52 | 5.77 | 5.37 | 5.69 | 7.19 | 7.33 | 7.19 | 8.11 | 8.28 | 12.7 | 13.1 | 15.9 | 20.1 | 20.1 | 21.2 | 6.14 |
| DISTANCE DIFFERENCE [m] | -6.5 | 0 | 0 | -10 | -2.5 | 27.1 | -28 | 0.04 | 0.91 | -0.2 | 0 | 0.11 | 0.06 | 0 | 0.76 | 0.25 | -0.4 | 0.32 | 1.5 | 0.14 | -0.1 | 0.92 | 0.17 | 4.42 | 0.44 | 2.73 | 4.18 | 0 | 1.11 | -15 |

(d)

| STRIP REGION No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| REPRESENTATIVE PARALLAX | 16 | 22 | 22 | 53 | 81 | 12 | 100 | 99 | 80 | 83 | 83 | 81 | 80 | 80 | 69 | 66 | 71 | 67 | 53 | 52 | 53 | 47 | 46 | 30 | 29 | 24 | 19 | 19 | 18 | 62 |
| DISTANCE [m] | 23.8 | 17.3 | 17.3 | 7.19 | 4.7 | 31.8 | 3.81 | 3.85 | 4.76 | 4.59 | 4.59 | 4.7 | 4.76 | 4.76 | 5.52 | 5.77 | 5.37 | 5.69 | 7.19 | 7.33 | 7.19 | 8.11 | 8.28 | 12.7 | 13.1 | 15.9 | 20.1 | 20.1 | 21.2 | 6.14 |
| DISTANCE DIFFERENCE [m] | -6.5 | 0 | 0 | -10 | -2.5 | 27.1 | -28 | 0.04 | 0.91 | -0.2 | 0 | 0.11 | 0.06 | 0 | 0.76 | 0.25 | -0.4 | 0.32 | 1.5 | 0.14 | -0.1 | 0.92 | 0.17 | 4.42 | 0.44 | 2.73 | 4.18 | 0 | 1.11 | -15 |

$\ell_{C1}$, $\ell_{C2}$, $\ell_{C3}$

VEHICLE RECOGNITION APPARATUS AND VEHICLE RECOGNITION METHOD

CROSS-REFERENCE TO RELATED APPLICATIONS

This application is based upon and claims the benefit of priority from Japanese Patent Application No. 2018-093969, filed May 15, 2018 and Japanese Patent Application No. 2019-003619, filed Jan. 11, 2019, the entire contents of which are incorporated herein by reference.

FIELD

Embodiments described herein relate generally to a vehicle recognition apparatus and a vehicle recognition method.

BACKGROUND

In the related art, there is known a technique of recognizing a vehicle based on a photographed image of the vehicle on a road. For example, the end of a column of vehicles can be easily recognized by using an image obtained by photographing the column of vehicles from the rear by using a stereo camera.

However, in the related art, although the nearest vehicle in the photographed image can be easily recognized, it is difficult to individually recognize vehicles overlapping with each other in the photographed image.

BRIEF DESCRIPTION OF THE DRAWINGS

FIG. 11 is a diagram illustrating respective pieces of information related to the strip regions in the first embodiment;

DETAILED DESCRIPTION

A vehicle recognition apparatus according to an embodiment includes one or more hardware processors to: acquire a photographed image obtained by photographing, using a stereo camera, a plurality of vehicles forming a column of vehicles on a road from an obliquely rearward direction with respect to the column of vehicles; generate a parallax image based on the photographed image; estimate a vanishing point in the parallax image; generate a plurality of strip regions by dividing a region below the vanishing point in the parallax image in a horizontal direction; calculate a representative parallax for each of the strip regions; extract strip regions, each being efficient in recognizing a vehicle, from among the strip regions based on the representative parallax; couple strip regions adjacent to each other among the extract strip regions to generate a coupled strip region based on a distance distribution model of a back surface and a side surface of a vehicle; and recognize a vehicle based on the coupled strip region.

The following describes embodiments (a first embodiment and a second embodiment) of the vehicle recognition apparatus and the vehicle recognition method according to the present invention with reference to the drawings.

First Embodiment

The following describes the first embodiment. The first embodiment describes an example in which a vehicle recognition system is applied to a tramcar (streetcar) that travels on an exclusive lane laid on part of a road. The vehicle recognition system according to the first embodiment photographs a plurality of vehicles constituting a column of vehicles on the road by using a stereo camera, and individually recognizes the vehicles based on the photographed image.

Figure 1:
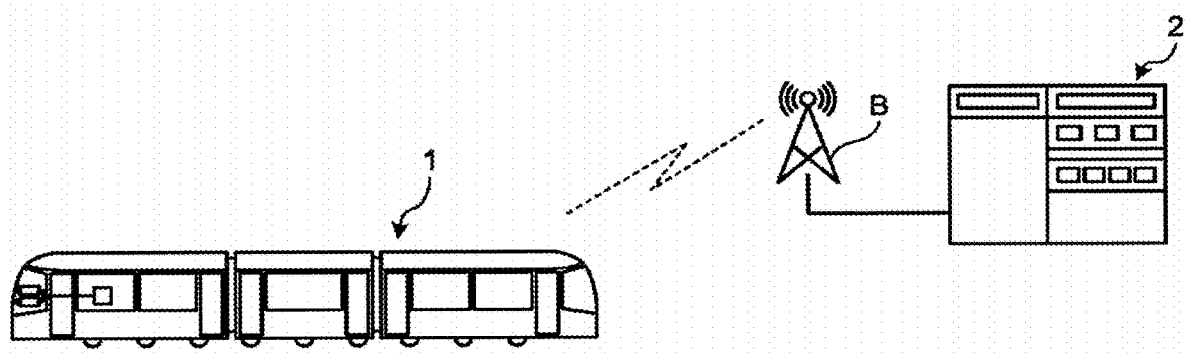
FIG. 1 is a diagram illustrating the entire configuration of a vehicle recognition system according to a first embodiment.

FIG. 1 is a diagram illustrating the entire configuration of a vehicle recognition system S according to the first embodiment. As illustrated in FIG. 1, the vehicle recognition system S according to the first embodiment includes a tramcar 1 traveling on an exclusive lane (illustrated in FIG. 4), and a vehicle recognition apparatus 2 installed in an operation management center that manages operation of the tramcar 1. The tramcar 1 and the vehicle recognition apparatus 2 are capable of wirelessly communicating with each other via a radio base station B. The vehicle recognition apparatus 2 is, for example, a server that manages operation of the tramcar 1.

Figure 2:
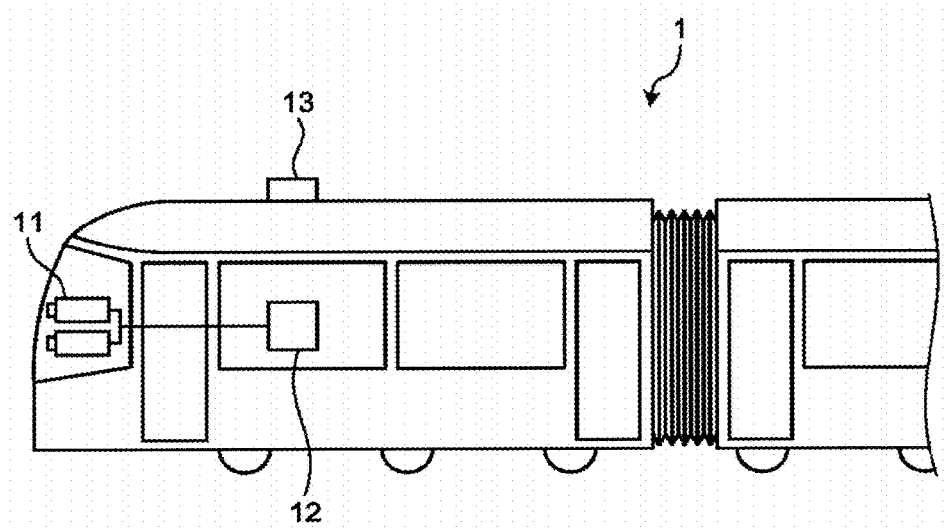
FIG. 2 is a diagram illustrating a configuration of a tramcar in the first embodiment.

FIG. 2 is a diagram illustrating a configuration of the tramcar 1 in the first embodiment. As illustrated in FIG. 2, the tramcar 1 includes a photographing device 11, an onboard device 12, and a communication device 13.

The photographing device 11 is a wide-angle camera and the like that is capable of photographing the exclusive lane and the surroundings thereof. For example, the photographing device 11 photographs a general lane on which a general vehicle travels adjacent to the exclusive lane, and an object such as a sign, a building (structure), and a tree around the road.

The communication device 13 is capable of communicating with an external device such as the vehicle recognition apparatus 2. The onboard device 12 acquires the photographed image photographed by the photographing device 11, and transmits the photographed image to the vehicle recognition apparatus 2 via the communication device 13.

Figure 3:
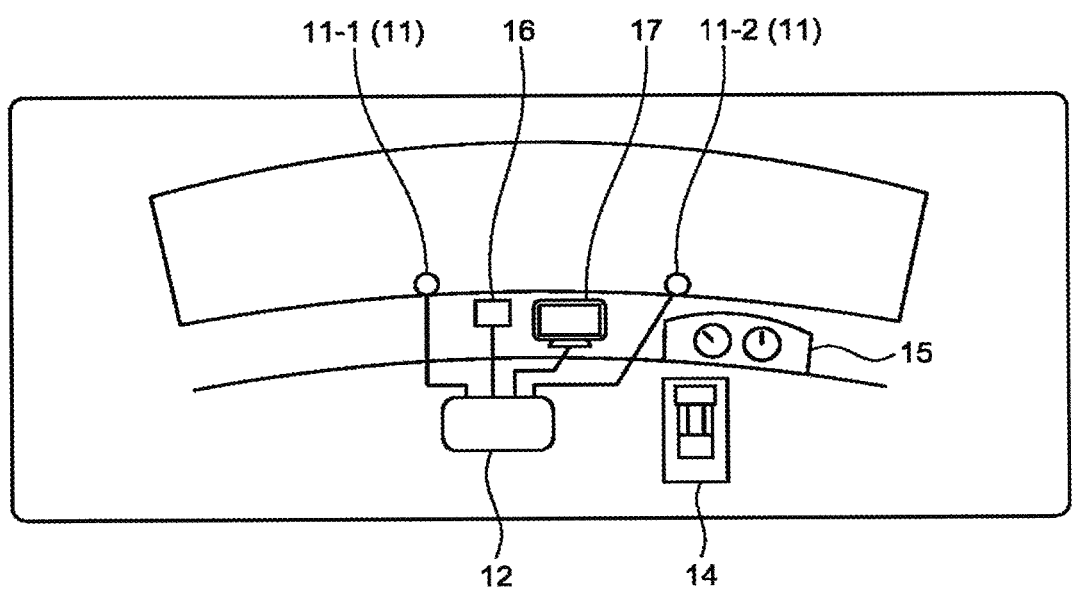
FIG. 3 is a diagram illustrating a configuration of a cockpit of the tramcar in the first embodiment.

FIG. 3 is a diagram illustrating a configuration of a cockpit of the tramcar 1 in the first embodiment. As illustrated in FIG. 3, in the cockpit (driver's seat) of the tramcar 1, a master controller 14, a meter 15, the photographing device 11, a Global Positioning System (GPS) receiver 16, and a display device 17 are provided.

The master controller 14 is a device that remotely controls speed of the tramcar 1. The meter 15 displays the speed and the like of the tramcar 1.

The photographing device 11 includes stereo cameras 11-1 and 11-2 that are arranged to be separated from each other in a horizontal direction with respect to the driver's seat of the tramcar 1. Arrangement positions and the number of photographing devices 11 illustrated in FIG. 3 are merely examples, and the embodiment is not limited thereto.

The display device 17 is capable of displaying various pieces of information such as the photographed image obtained by the photographing device 11.

The GPS receiver 16 calculates a position of the tramcar 1 based on GPS signals received from GPS satellites.

Figure 4:
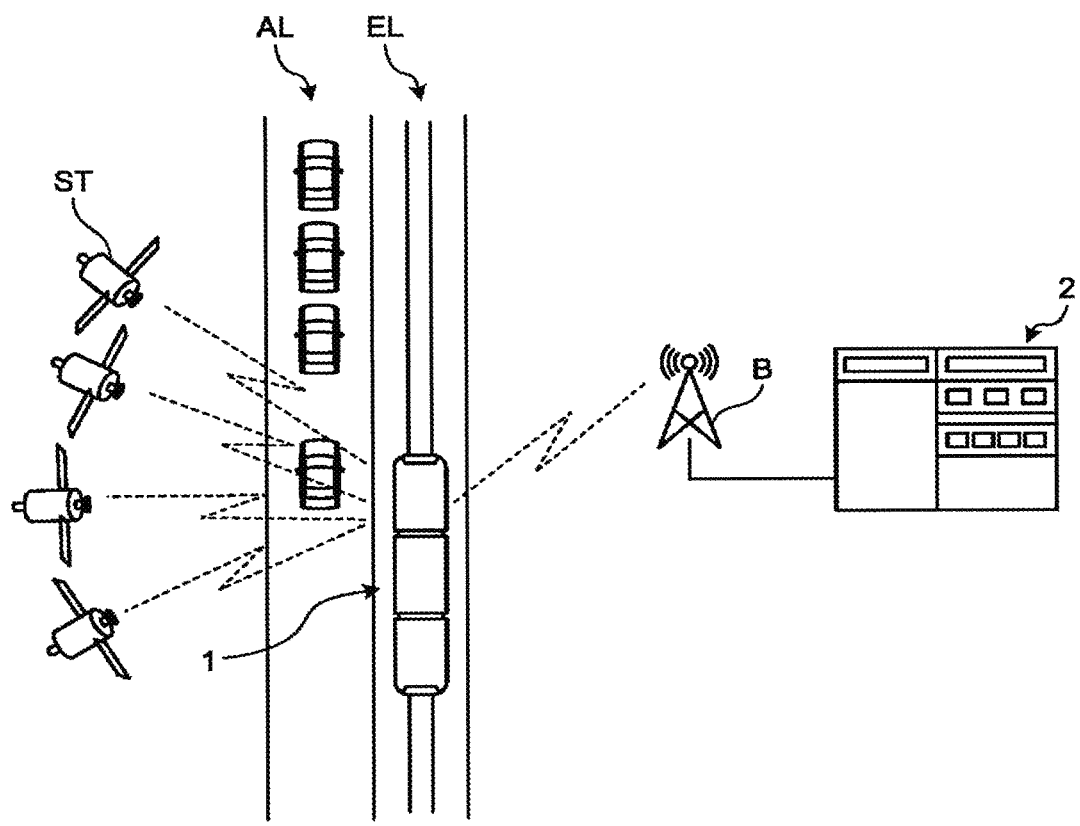
FIG. 4 is a diagram for explaining acquisition of a position of the tramcar with GPS signals in the first embodiment.

FIG. 4 is a diagram for explaining calculation of the position of the tramcar 1 with the GPS signals in the first embodiment. The GPS receiver 16 receives the GPS signals from GPS satellites ST via a GPS antenna, and calculates the position of the tramcar 1 based on the received GPS signals.

As illustrated in FIG. 4, the photographing device 11 is capable of photographing a general lane AL adjacent to an exclusive lane EL in addition to the exclusive lane EL on which the tramcar 1 travels.

The onboard device 12 transmits, to the vehicle recognition apparatus 2 via the radio base station B, information indicating the position of the tramcar 1 calculated from the GPS signals, the photographed image photographed by the photographing device 11, and a photographing time of the photographed image. The information indicating the position of the tramcar 1 (hereinafter, also referred to as "GPS position information") is, for example, latitude and longitude.

The onboard device 12 and the vehicle recognition apparatus 2 include, for example, a central processing unit (CPU), a storage device such as a read only memory (ROM) and a random access memory (RAM), and an external storage device such as a hard disk drive (HDD) and a solid state drive (SSD), and have a hardware configuration utilizing a normal computer.

Figure 5:
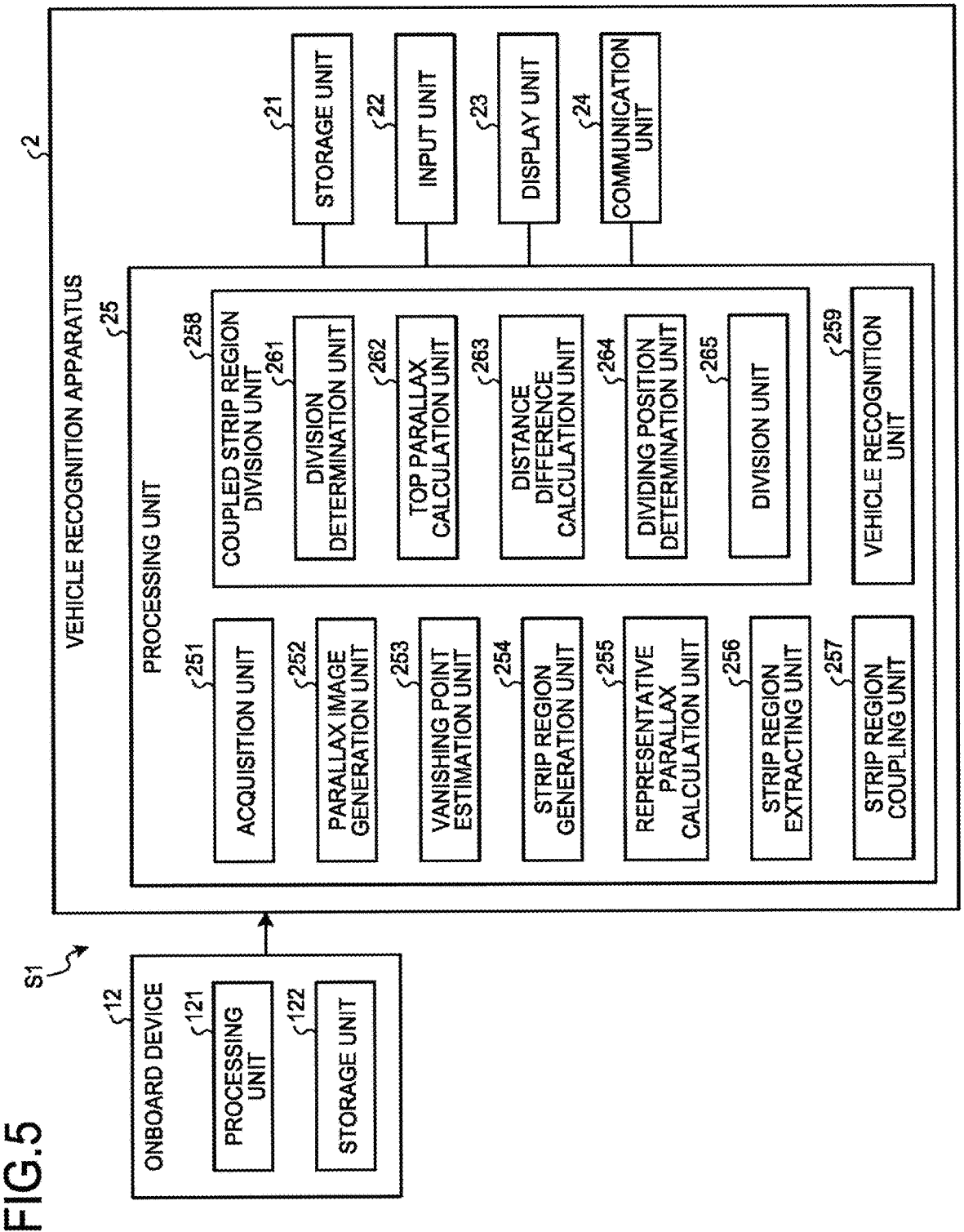
FIG. 5 is a diagram illustrating a functional configuration of an onboard device and a vehicle recognition apparatus in the first embodiment.

FIG. 5 is a diagram illustrating a functional configuration of the onboard device 12 and the vehicle recognition apparatus 2 in the first embodiment. The onboard device 12 includes a processing unit 121 and a storage unit 122.

The storage unit 122 stores an operation program of the processing unit 121, and various pieces of information such as the GPS position information, the photographed image photographed by the photographing device 11, and the photographing time of the photographed image.

The processing unit 121 transmits, to the vehicle recognition apparatus 2, various pieces of information such as the GPS position information, the photographed image, and the photographing time via the communication device 13 based on the operation program.

The vehicle recognition apparatus 2 includes a storage unit 21, an input unit 22, a display unit 23, a communication unit 24, and a processing unit 25.

The storage unit 21 stores the operation program of the processing unit 25, and various pieces of information such as the GPS position information, the photographed image, and the photographing time received from the onboard device 12.

The input unit 22 is a module through which a user of the vehicle recognition apparatus 2 inputs information, and includes a keyboard and a mouse, for example. The display unit 23 is a module on which various pieces of information are displayed, and includes a liquid crystal display (LCD), for example. The communication unit 24 is a communication interface for communicating with an external device such as the onboard device 12.

The processing unit 25 is a computing module, and includes an acquisition unit 251, a parallax image generation unit 252, a vanishing point estimation unit 253, a strip region generation unit 254, a representative parallax calculation unit 255, a strip region extracting unit 256, a strip region coupling unit 257, a coupled strip region division unit 258, and a vehicle recognition unit 259.

The acquisition unit 251 acquires a photographed image from the onboard device 12. The photographed image is obtained by photographing a plurality of vehicles constituting a column of vehicles on a road from an obliquely rearward direction with respect to the column of vehicles by using the stereo cameras 11-1 and 11-2 (FIG. 3).

The parallax image generation unit 252 generates a parallax image based on the photographed image.

Figure 6:
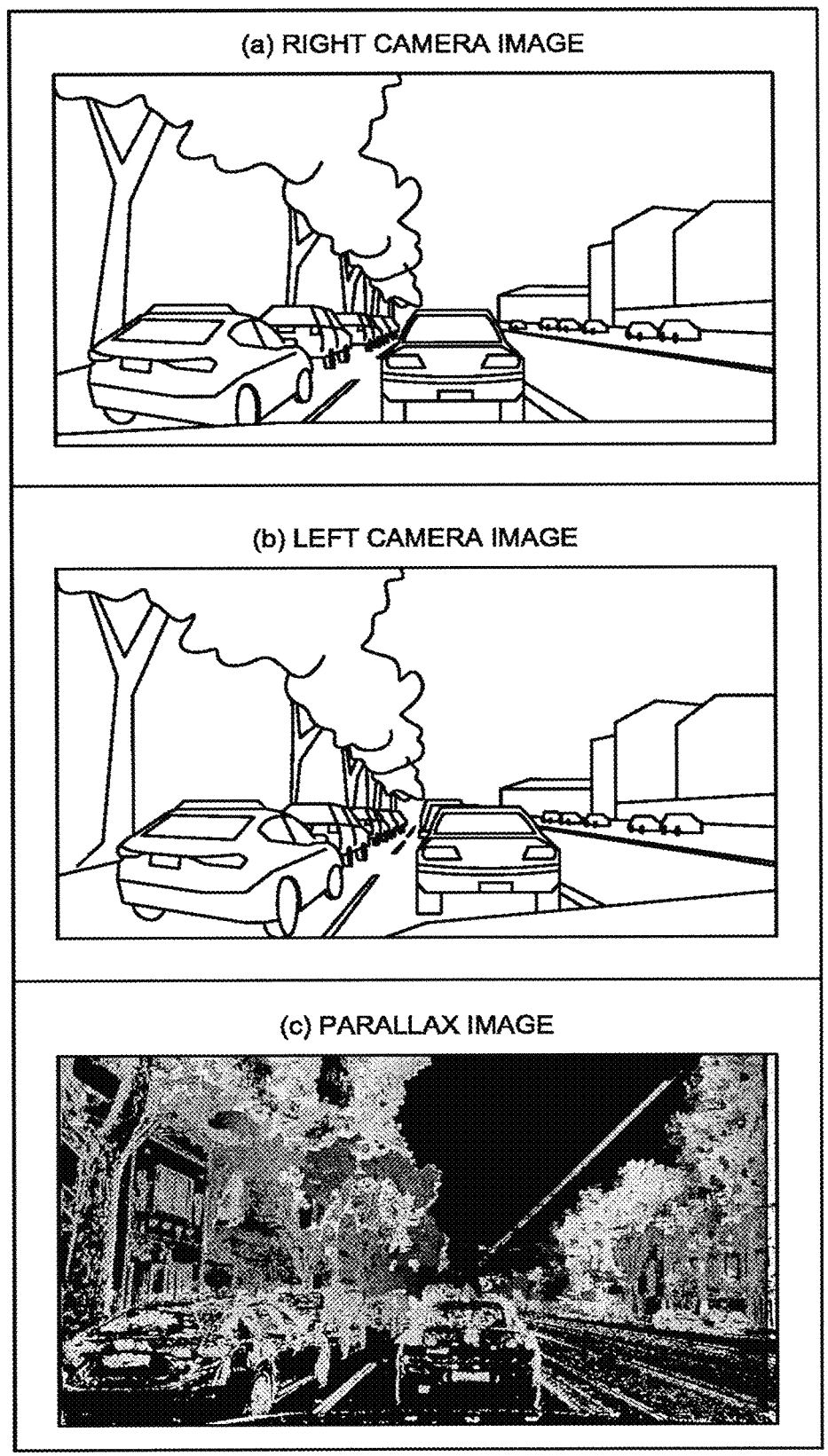
FIG. 6 is a diagram illustrating respective images in the first embodiment.

FIG. 6 is a diagram illustrating respective images in the first embodiment. Specifically, FIG. 6(a) is a photographed image (right camera image) photographed by a right camera (stereo camera 11-2 (FIG. 3)). FIG. 6(b) is a photographed image (left camera image) photographed by a left camera (stereo camera 11-1 (FIG. 3)). FIG. 6(c) is a parallax image that is generated based on the right camera image and the left camera image. The parallax image can be created by using a known method.

Returning to FIG. 5, the vanishing point estimation unit 253 estimates a vanishing point in the parallax image. The vanishing point is a pixel in which a horizon or a distant object is reflected. The vanishing point can also be estimated by using a known method.

The strip region generation unit 254 divides a region below the vanishing point in the parallax image in the horizontal direction to generate a plurality of strip regions.

Figure 7:
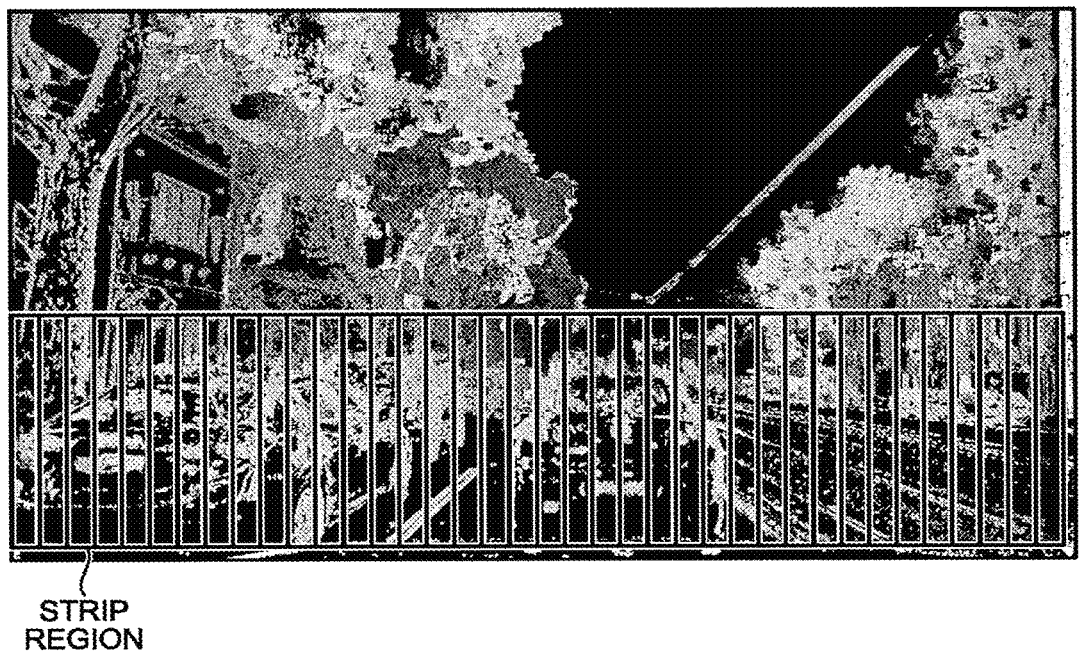
FIG. 7 is a diagram illustrating a state in which strip regions are provided on a parallax image in the first embodiment.

FIG. 7 is a diagram illustrating a state in which the strip regions are provided on the parallax image in the first embodiment. For example, the strip region generation unit 254 determines the number of the strip regions based on resolution of the parallax image, and divides the region below the vanishing point in the parallax image in the horizontal direction to generate a plurality of strip regions based on the determined number. The width of each strip region is, for example, 21 pixels at regular intervals.

Returning to FIG. 5, the representative parallax calculation unit 255 calculates a representative parallax for each of the strip regions. For example, the representative parallax calculation unit 255 calculates a frequency distribution of parallaxes each having a parallax value equal to or larger than a first predetermined value among parallaxes of the pixels for each of the strip regions, and sets a most frequent value of the frequency distribution as the representative parallax.

The strip region extracting unit 256 extracts a strip region efficient in recognizing the vehicle from the strip regions based on the representative parallax. For example, the strip region extracting unit 256 extracts, as the strip region efficient in recognizing the vehicle, a cluster of pixels having the representative parallax from the strip regions in which the representative parallax exists.

Figure 8:
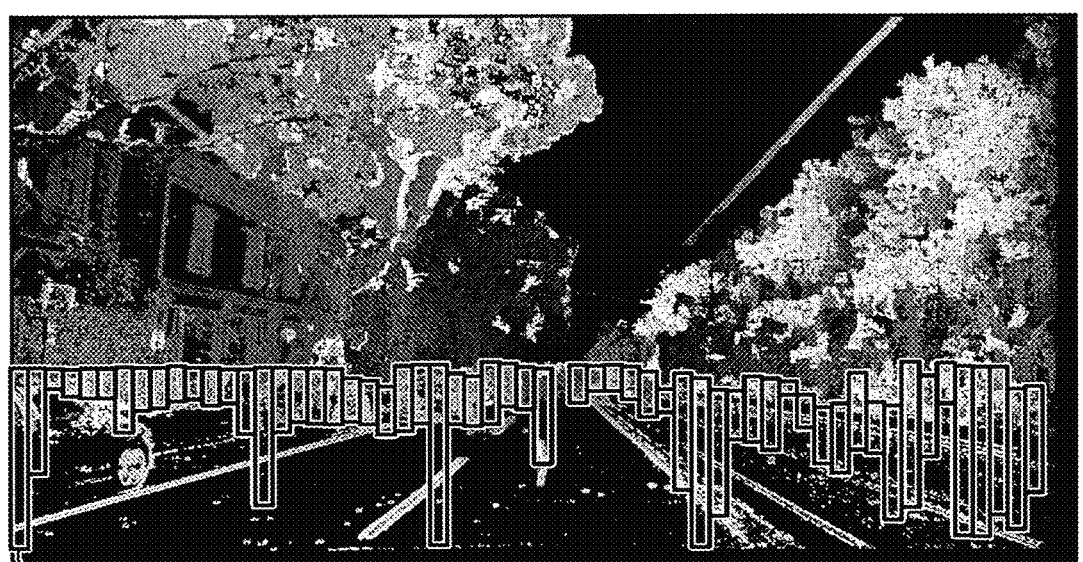
FIG. 8 is a diagram illustrating an example of the parallax image in the first embodiment.

FIG. 8 is a diagram illustrating an example of the parallax image in the first embodiment. FIG. 8 illustrates a case of calculating distribution of the representative parallax in the strip region, and extracting the cluster of pixels having the representative parallax as the strip region efficient in recognizing the vehicle.

Returning to FIG. 5, when there are two clusters of pixels having the representative parallax in the strip region, and a difference (H2) in distances between bottom end positions of the two clusters is equal to or larger than a second predetermined value (for example, ¼ (H1) of the height of the strip region, which is appropriately set based on an angle of view and the like of the photographing device 11), the strip region extracting unit 256 extracts a larger cluster of the two clusters as the strip region efficient in recognizing the vehicle.

Figure 9:
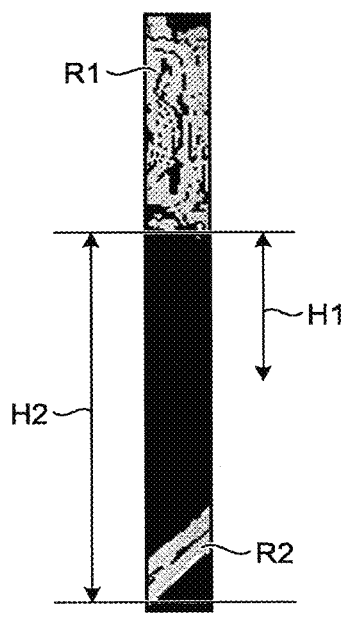
FIG. 9 is a diagram illustrating an example of the strip region in the first embodiment.

FIG. 9 is a diagram illustrating an example of the strip region in the first embodiment. As illustrated in FIG. 9, when two regions R1 and R2 are extracted as clusters of the representative parallax in the strip region, the strip region extracting unit 256 calculates a difference in distances between the bottom end positions of the respective clusters. When the difference is equal to or larger than ¼ of the height of the strip region, the strip region extracting unit 256 determines that a smaller cluster (that is, the region R2 in FIG. 9, in which a white line is reflected) is a non-vehicle region, and excludes the non-vehicle region from the strip region.

Figure 10:
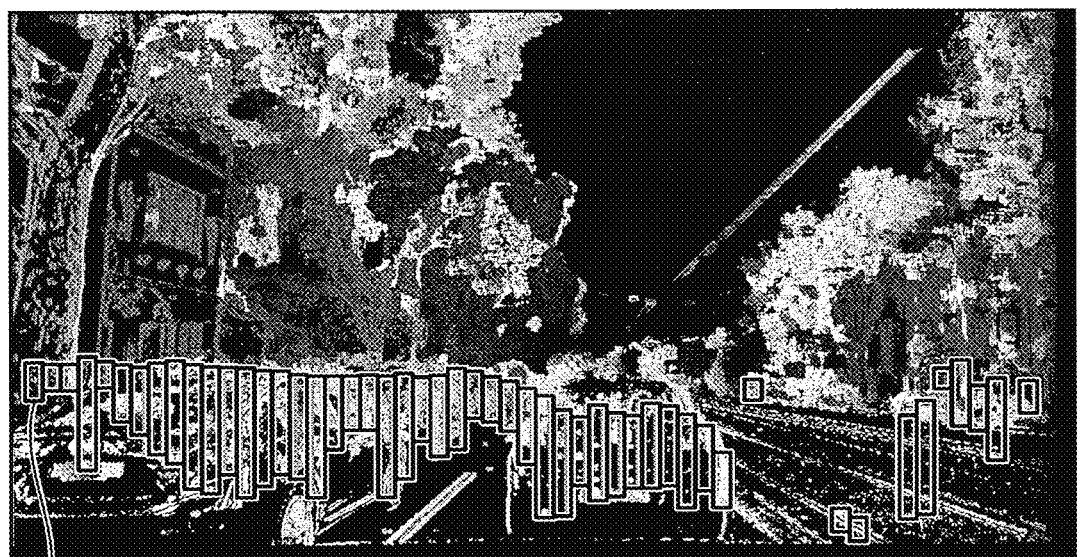
FIG. 10 is a diagram illustrating an example of the parallax image in which strip regions efficient in recognizing a vehicle are extracted in accordance with a standard illustrated in FIG. 9 in the first embodiment.

FIG. 10 is a diagram illustrating an example of the parallax image in which strip regions efficient in recognizing the vehicle are extracted in accordance with a standard illustrated in FIG. 9 in the first embodiment.

Returning to FIG. 5, the strip region coupling unit 257 couples extracted adjacent strip regions to generate a coupled strip region based on a distance distribution model of a back surface and a side surface of the vehicle. In this case, the distance distribution model represents that, for example, a distance to each point on the back surface of the vehicle is substantially constant (including constant), and a distance to each point on the side surface of the vehicle along a traveling direction of the road varies within a range of predetermined variation rate.

The strip region coupling unit 257 converts the representative parallax of each strip region into a distance based on the distance distribution model. When the distance between the two adjacent strip regions is equal to or smaller than a third predetermined value (for example, 3 m), the strip region coupling unit 257 couples the two adjacent strip regions to generate the coupled strip region.

FIG. 11 is a diagram illustrating respective pieces of information related to the strip regions in the first embodiment. As illustrated in FIG. 11(a), the respective pieces of information related to the strip regions are a strip region number (No.; an identifier of the strip region), a representative parallax, and a distance (m) in this order from the top. FIG. 11(b) illustrates a calculation result of the distance (distance difference (m)) between two adjacent strip regions. FIG. 11(c) illustrates a case in which, when the distance difference is equal to or smaller than the third predetermined value (for example, 3 m), a strip region of interest is coupled to a strip region adjacent thereto on the left, and the coupled strip regions are represented in the same background color.

Returning to FIG. 5, the vehicle recognition unit 259 recognizes the vehicle based on the coupled strip region. For example, the vehicle recognition unit 259 recognizes, as the vehicle, the coupled strip region obtained by coupling three or more strip regions. In this case, FIG. 11(d) illustrates a case in which vehicles C1 to C3 are extracted.

A procedure of recognizing the vehicle can be summarized as the following (1) to (4).

Figure 12:
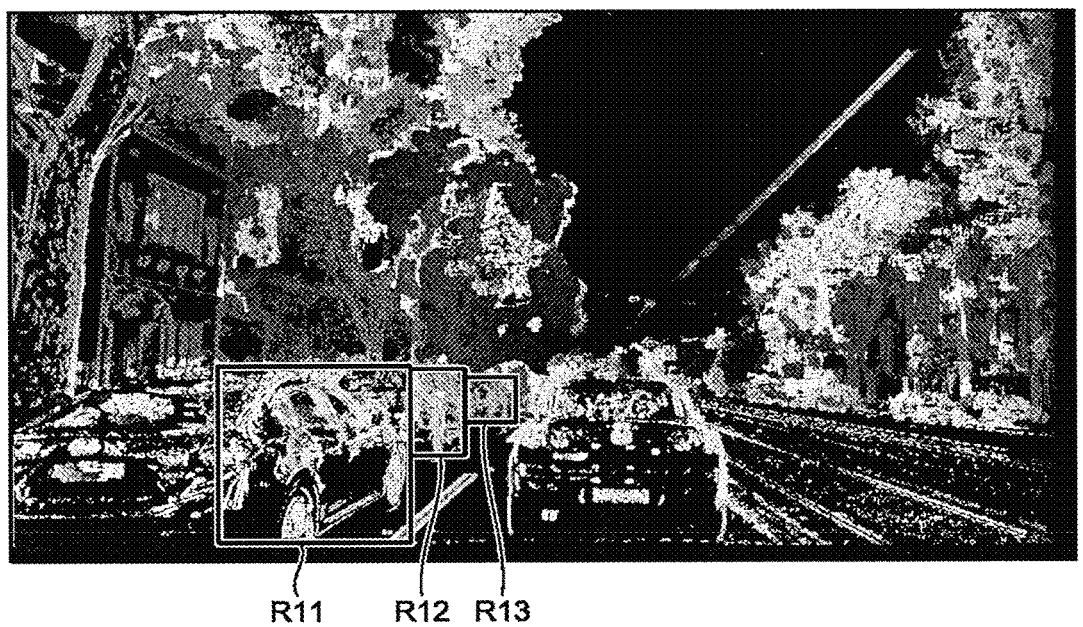
FIG. 12 is a diagram illustrating an example of the parallax image in the first embodiment.

(1) Convert the representative parallax of each strip region into the distance (2) Calculate the distance difference between adjacent strip regions (3) Couple the strip regions when the distance difference is included in a range of ±3.0 m (4) Recognize the coupled strip region obtained by coupling three or more strip regions as the vehicle FIG. 12 is a parallax image obtained by recognizing an individual vehicle as described above. It can be found that an individual vehicle is recognized for each of regions R11, R12, and R13 as coupled strip regions in the parallax image illustrated in FIG. 12.

Figure 13:
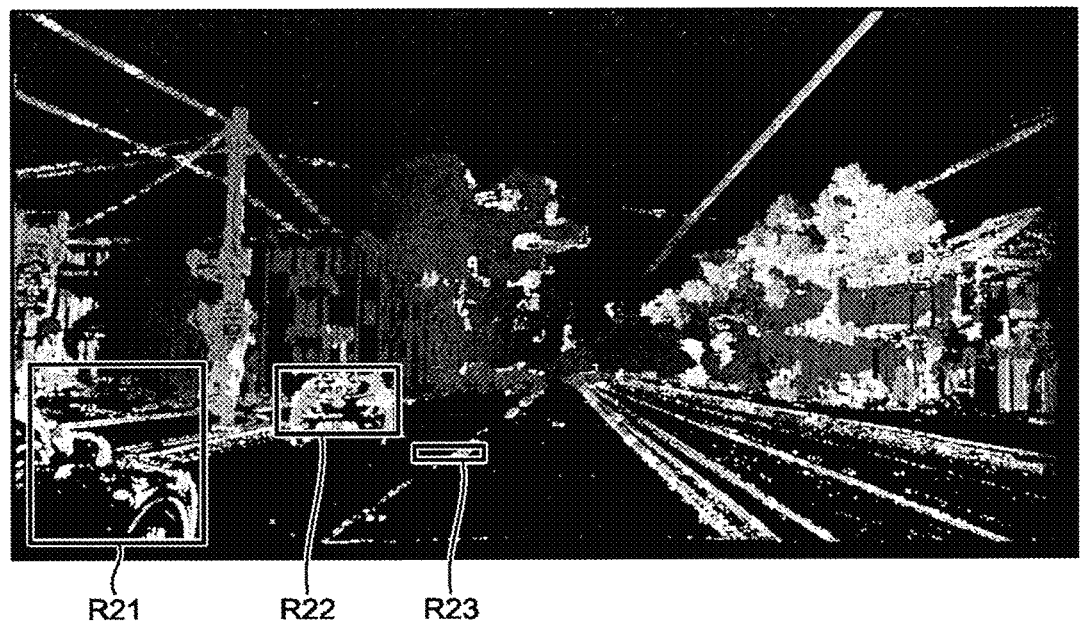
FIG. 13 is a diagram illustrating an example of the parallax image in which a white line on a road is erroneously detected as a vehicle in the first embodiment.

FIG. 13 is a diagram illustrating an example of the parallax image in which a white line on the road is erroneously detected as the vehicle in the first embodiment. In the parallax image illustrated in FIG. 13, among regions R21, R22, and R23 as the coupled strip regions, one vehicle is reflected in each of the regions R21 and R22, while the white line of the road is reflected in the region R23.

As a method of preventing such erroneous detection, when determining whether or not the coupled strip region includes the vehicle, the vehicle recognition unit 259 may determine that the coupled strip region is non-vehicle when the number of pixels having the representative parallax in the strip region at a coupling start position (on the left end) accounts for not more than 5% of the total number of pixels in the strip region, for example. By performing this determination, a possibility of erroneously detecting the white line as the vehicle can be greatly reduced.

Figure 14:
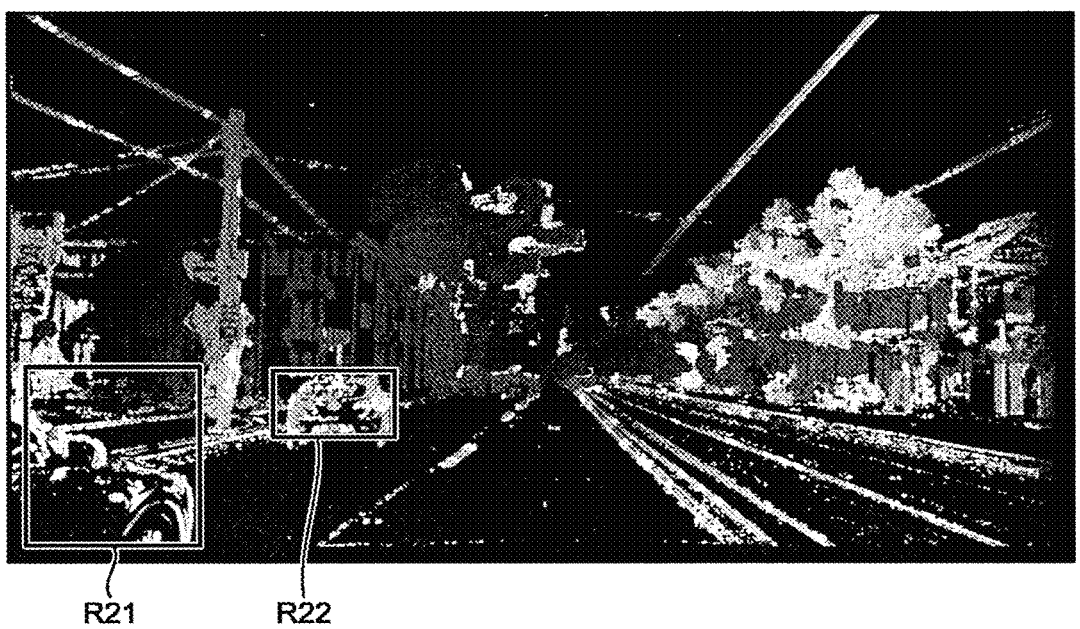
FIG. 14 is a diagram illustrating a case in which a region R23 corresponding to a white line is determined to be non-vehicle as compared with the parallax image in FIG. 13.

FIG. 14 is a diagram illustrating a case in which the region R23 corresponding to the white line is determined to be non-vehicle as compared with the parallax image in FIG. 13.

Figure 15:
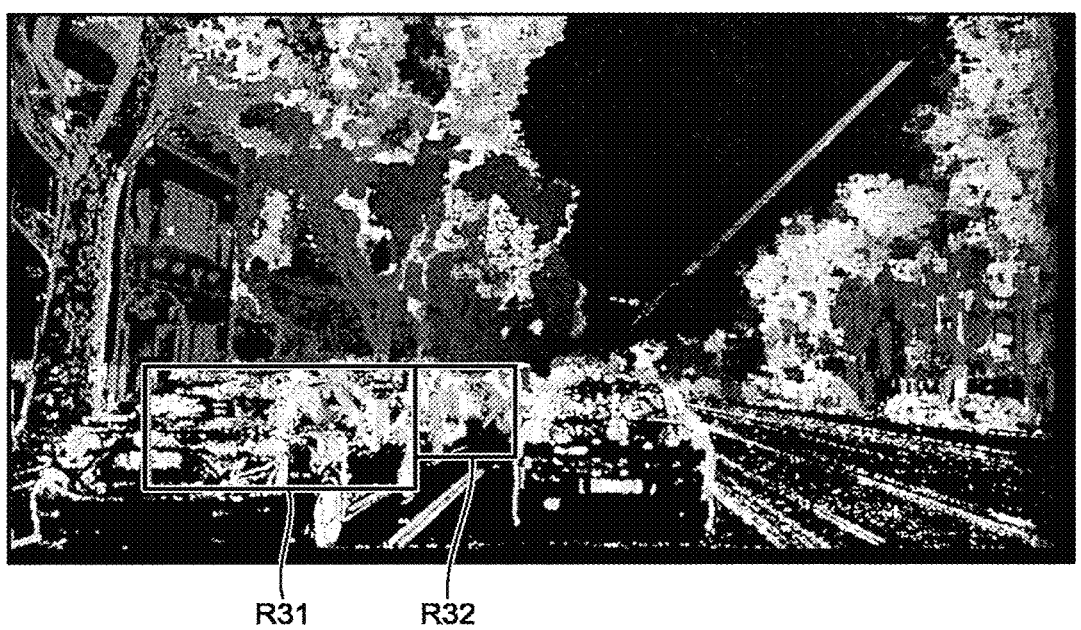
FIG. 15 is a diagram illustrating an example of the parallax image in which one coupled strip region includes two vehicles in the first embodiment.

FIG. 15 is a diagram illustrating an example of the parallax image in which one coupled strip region includes two vehicles in the first embodiment. In the parallax image illustrated in FIG. 15, in which the regions R31 and R32 as the coupled strip regions are provided, one vehicle corresponds to the region R31, whereas two vehicles correspond to the region R32.

In order to reduce the above-mentioned possibility that a single coupled strip region includes two vehicles, the processing unit 25 of the vehicle recognition apparatus 2 is provided with the coupled strip region division unit 258. The coupled strip region division unit 258 includes a division determination unit 261, a top parallax calculation unit 262, a distance difference calculation unit 263, a dividing position determination unit 264, and a division unit 265.

The division determination unit 261 determines, based on the number of strip regions in a coupled strip region, whether or not the coupled strip region is a division target. For example, when the number of strip regions in the coupled strip region is equal to or larger than a fourth predetermined value (for example, "6"), the division determination unit 261 determines the coupled strip region as being the division target.

The top parallax calculation unit 262 calculates top two parallaxes having higher frequency of occurrence from each of the strip regions constituting the coupled strip region that is determined to be the division target. For example, the top parallax calculation unit 262 divides the coupled strip region (the region R32 in FIG. 15) determined to be the division target into two regions in the horizontal direction (width direction). After that, the top parallax calculation unit 26 calculates a frequency distribution of parallax for each of the strip regions constituting a region on the right side of a dividing position (a right half of the region R32 in FIG. 15), and calculates top two parallaxes having higher frequency of occurrence. A side surface of the vehicle is reflected in the right half region of the region R32. That is, in a case as illustrated in FIG. 15, in the region R32 in which two vehicles are joined together, the strip region in which two vehicles are reflected is often present on the right side of the center in the horizontal direction, so that the processing as described above is performed. The embodiment is not limited thereto, and the processing may be performed on all the strip regions in the coupled strip region.

The distance difference calculation unit 263 calculates the difference in distances based on the top two parallaxes. For example, when the frequency of occurrence of each of the top two parallaxes calculated by the top parallax calculation unit 262 is equal to or larger than a fifth predetermined value (for example, the number of pixels is equal to or larger than 200), the distance difference calculation unit 263 converts the parallax into distances, and calculates a difference in the distances.

When the calculated distance difference is included in a predetermined range (for example, 2 to 5 m), the dividing position determination unit 264 determines that a horizontal position in the strip region is a horizontal position for dividing the coupled strip region into two regions. For example, the dividing position determination unit 264 determines whether or not the distance difference calculated by the distance difference calculation unit is included in the predetermined range for each of the strip regions in a direction from the center in the horizontal direction of the coupled strip region determined to be the division target toward a side on which the side surface of the vehicle is reflected. When the distance difference is included in the predetermined range, the dividing position determination unit 264 determines that the horizontal position in the strip region is the horizontal position for dividing the coupled strip region into two regions. The embodiment is not limited thereto similarly to the case of the top parallax calculation unit 262, and the processing may be performed on all the strip regions in the coupled strip region.

The division unit 265 divides the coupled strip region into two divided regions based on the horizontal position determined by the dividing position determination unit 264. The vehicle recognition unit 259 then recognizes the vehicle based on each of the two divided regions.

Figure 16:
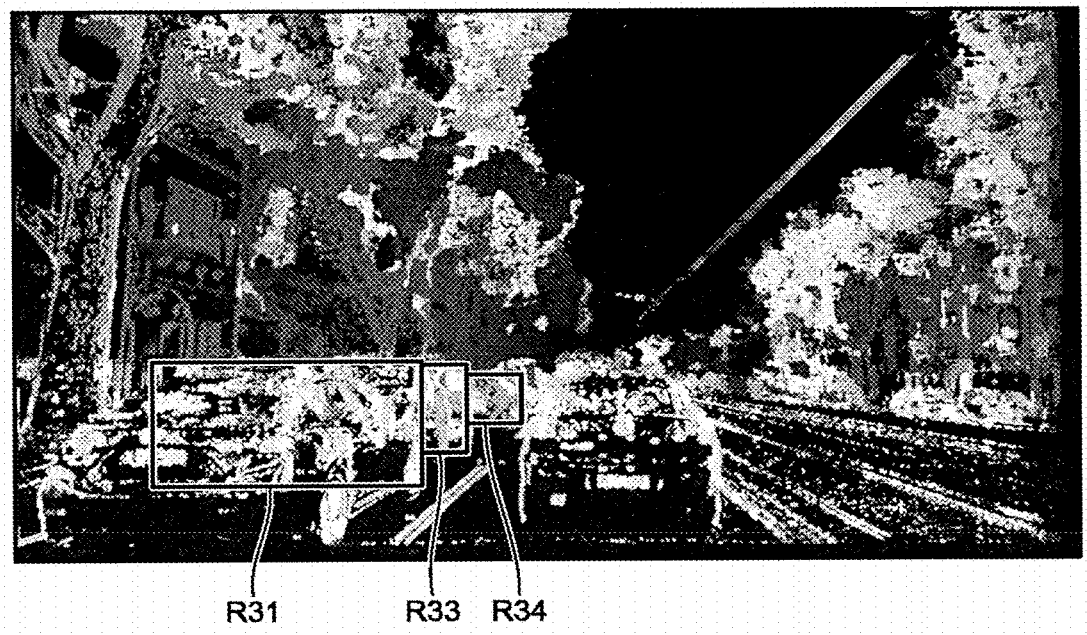
FIG. 16 is a diagram illustrating a case in which a region R32 is divided into two regions R33 and R34 as compared with the parallax image in FIG. 15.

FIG. 16 is a diagram illustrating a case in which the region R32 is divided into two regions R33 and R34 as compared with the parallax image in FIG. 15. In this way, one coupled strip region including two vehicles can be divided into two regions, and one-to-one correspondence can be made between the region and the vehicle.

Figure 17:
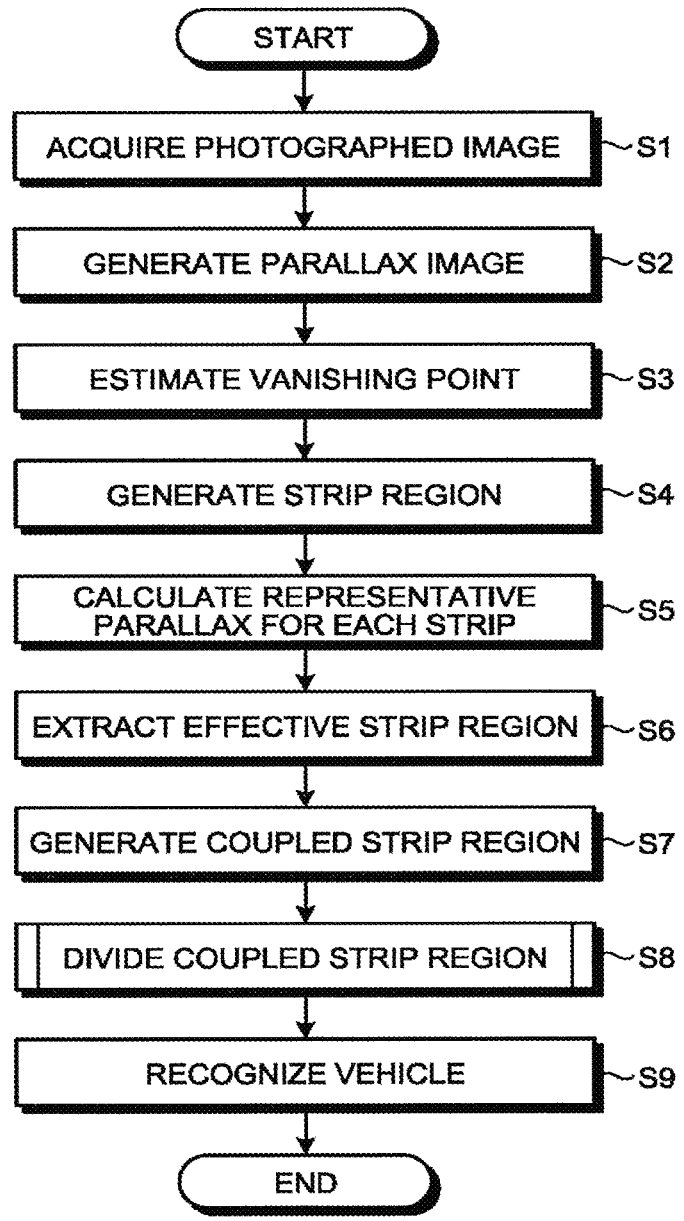
FIG. 17 is a flowchart illustrating processing performed by the vehicle recognition apparatus in the first embodiment.

Next, the following describes processing performed by the vehicle recognition apparatus 2 according to the first embodiment with reference to FIG. 17. FIG. 17 is a flowchart illustrating the processing performed by the vehicle recognition apparatus 2 in the first embodiment. First, in the processing unit 25 of the vehicle recognition apparatus 2, the acquisition unit 251 acquires, from the onboard device 12, the photographed image obtained by photographing a plurality of vehicles constituting the column of vehicles on the road from the obliquely rearward direction with respect to the column of vehicles using the stereo cameras 11-1 and 11-2 (FIG. 3) (Step S1).

The parallax image generation unit 252 generates a parallax image (FIG. 6(c)) based on the photographed image (Step S2).

The vanishing point estimation unit 253 estimates a vanishing point in the parallax image (Step S3). The strip region generation unit 254 divides a region below the vanishing point in the parallax image in the horizontal direction to generate a plurality of strip regions (Step S4: refer to FIG. 7).

The representative parallax calculation unit 255 calculates the representative parallax for each of the strip regions (Step S5). The strip region extracting unit 256 extracts strip regions, each being efficient in recognizing the vehicle, from among the strip regions based on the representative parallax (Step S6: refer to FIG. 8).

The strip region coupling unit 257 couples the extracted adjacent strip regions to generate the coupled strip region based on the distance distribution model of the back surface and the side surface of the vehicle (Step S7: refer to FIG. 12).

The coupled strip region division unit 258 divides the coupled strip region (Step S8). The process at Step S8 is not essential.

Figure 18:
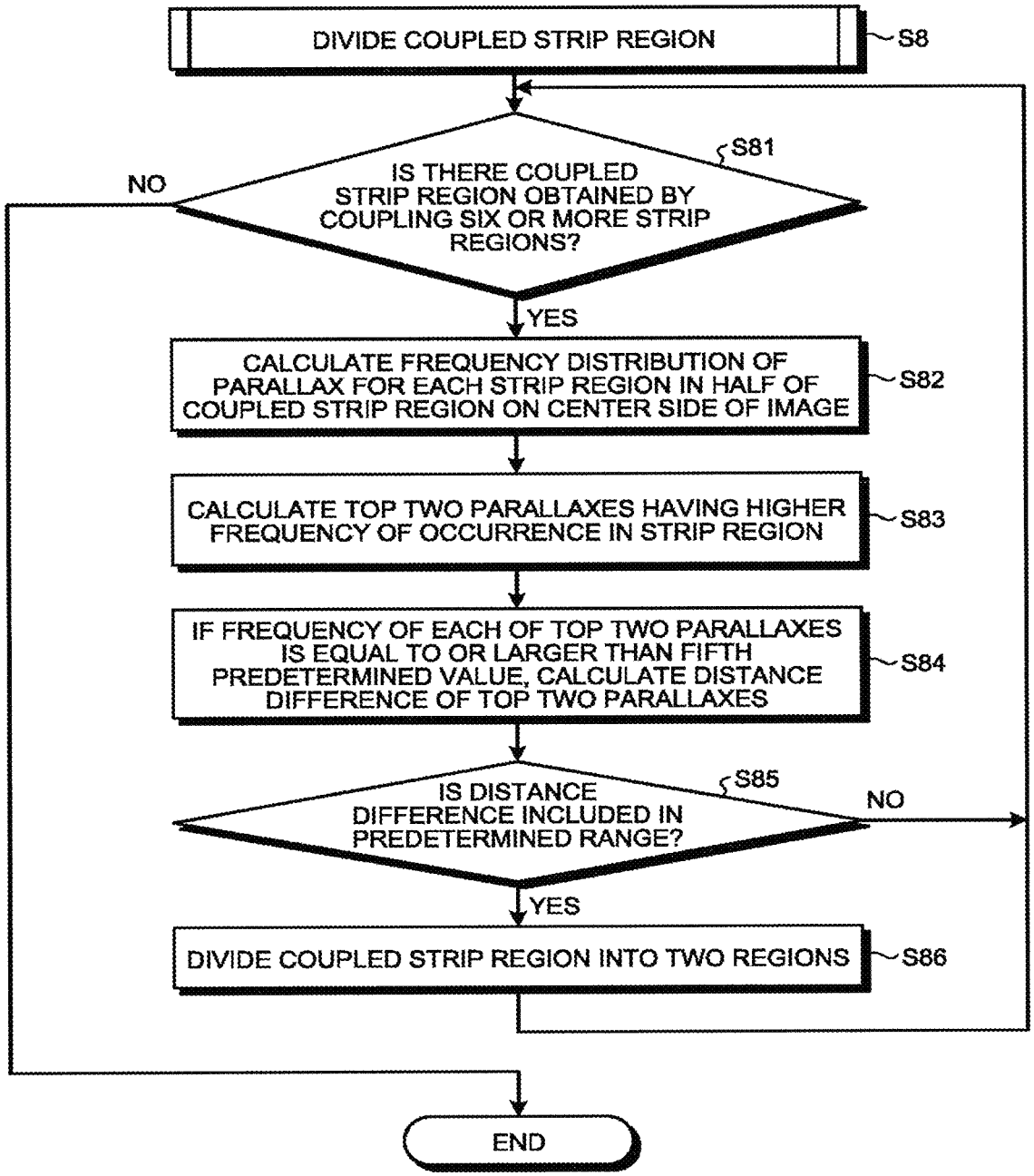
FIG. 18 is a flowchart illustrating details of Step S8 in the processing in FIG. 17.

FIG. 18 is a flowchart illustrating details of Step S8 in the processing in FIG. 17.

First, the division determination unit 261 determines whether or not there is a coupled strip region obtained by coupling six or more strip regions (Step S81). In a case of Yes at Step S81, the process proceeds to Step S82. In a case of No at Step S81, the process at Step S8 ends.

At Step S82, the top parallax calculation unit 262 calculates the frequency distribution of parallax for each of the strip regions in a half of the coupled strip region on the center side of the image.

The top parallax calculation unit 262 calculates top two parallaxes having higher frequency of occurrence in the strip region (Step S83).

When the frequency of occurrence of each of the top two parallaxes is equal to or larger than the fifth predetermined value, the distance difference calculation unit 263 converts the parallax into the distance, and calculates a difference in distances (Step S84).

The dividing position determination unit 264 determines whether or not the calculated distance difference is included in a predetermined range (for example, 2 to 5 m) (Step S85). In a case of Yes at Step S85, the process proceeds to Step S86. In a case of No at Step S85, the process returns to Step S81.

At Step S86, the dividing position determination unit 264 determines that the horizontal position in the strip region is the horizontal position for dividing the coupled strip region into two regions, and the division unit 265 divides the coupled strip region into two divided regions based on the determined horizontal position.

Returning to FIG. 17, at Step S9, the vehicle recognition unit 259 recognizes the vehicle based on the coupled strip region. For example, the vehicle recognition unit 259 recognizes, as the vehicle, the coupled strip region obtained by coupling three or more strip regions (refer to FIG. 11(d)). In order to prevent the white line and the like on the road from being erroneously detected as the vehicle, the vehicle recognition unit 259 may determine that the coupled strip region is non-vehicle when the number of pixels having the representative parallax in the strip region at a coupling start position (on the left end) accounts for not more than 5% of the total number of pixels in the strip region, for example. When the coupled strip region is divided at Step S8, the vehicle recognition unit 259 recognizes the vehicle based on each of the two divided regions obtained by dividing the coupled strip region.

In this way, with the vehicle recognition apparatus 2 according to the first embodiment, a plurality of vehicles overlapping with each other in the photographed image can be individually recognized. Specifically, the vehicle recognition apparatus 2 is capable of individually recognizing a plurality of vehicles overlapping with each other in the photographed image by generating a plurality of strip regions on a lower side of the parallax image, and coupling the strip regions to generate the coupled strip region based on the distance distribution model of the back surface and the side surface of the vehicle. Accordingly, the vehicle recognition apparatus 2 can count the number of vehicles in the column of vehicles more correctly.

The vehicle recognition apparatus 2 can divide a region, which is once set as the coupled strip region, into two regions by checking top two parallaxes having higher frequency of occurrence for each of the strip regions, so that a possibility that the coupled strip region includes two vehicles can be reduced.

The vehicle recognition apparatus 2 can determine the number of strip regions more appropriately based on the resolution of the parallax image.

The vehicle recognition apparatus 2 can determine the representative parallax easily and more appropriately by calculating the frequency distribution of parallaxes each having a parallax value equal to or larger than the first predetermined value among the parallaxes of the pixels for each strip region, and setting the most frequent value of the frequency distribution as the representative parallax.

When there are two clusters of pixels having the representative parallax in the strip region, and the distance difference between the bottom end positions of the respective two clusters is equal to or larger than the second predetermined value, the vehicle recognition apparatus 2 can extract a larger cluster of the two clusters as the strip region efficient in recognizing the vehicle to exclude a non-vehicle portion with high accuracy.

The vehicle recognition apparatus 2 can couple two adjacent strip regions more appropriately based on the distance distribution model.

In the related art (for example, a conventional pattern recognition technique), it is assumed that the nearest vehicle in the photographed image is recognized, so that it is difficult to individually recognize a plurality of vehicles overlapping with each other in the photographed image.

Second Embodiment

Next, the following describes a second embodiment. Description similar to that of the first embodiment will be appropriately omitted. As an example of a situation around a photographing target, a fence may be provided at a boundary portion between a tramcar traveling lane (exclusive lane) near a streetcar stop (stopping place of a tramcar) and a road for a vehicle.

Figure 19:
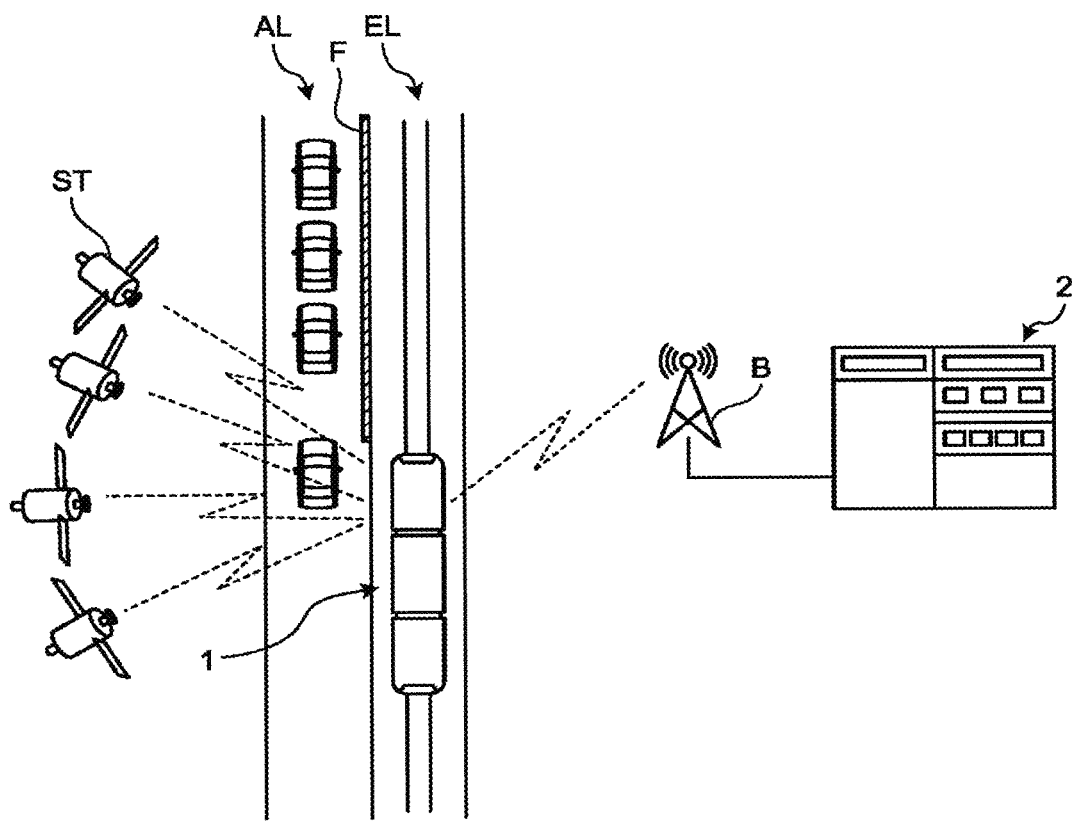
FIG. 19 is a schematic diagram illustrating a state in which a fence is provided between a road and an exclusive lane according to a second embodiment.

FIG. 19 is a schematic diagram illustrating a state in which a fence F is provided between a road and an exclusive lane according to the second embodiment. In such a condition, when the vehicle on the road is photographed by the photographing device 11 mounted on the tramcar 1, it may be difficult to detect the vehicle alone because the fence F and the vehicle are photographed to be overlapped with each other. The second embodiment describes a method of detecting only the vehicle in such a case.

Figure 20:
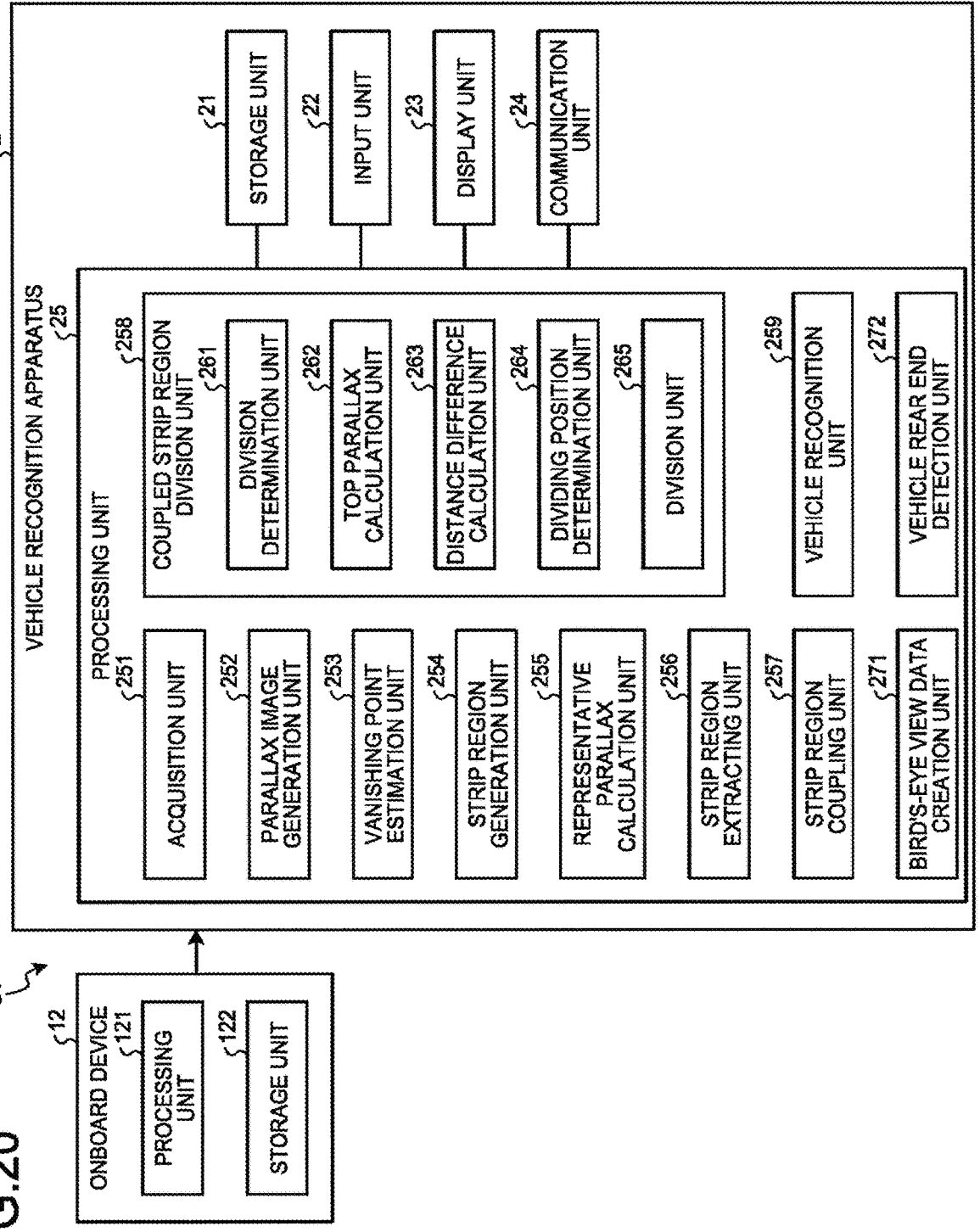
FIG. 20 is a diagram illustrating a functional configuration of an onboard device and a vehicle recognition apparatus in the second embodiment.

FIG. 20 is a diagram illustrating a functional configuration of the onboard device 12 and the vehicle recognition apparatus 2 in the second embodiment. In the vehicle recognition apparatus 2, the processing unit 25 further includes a bird's-eye view data creation unit 271 and a vehicle rear end detection unit 272.

The bird's-eye view data creation unit 271 creates, based on the parallax image, bird's-eye view data representing a view of the road from directly above. Specifically, the bird's-eye view data creation unit 271 creates the bird's-eye view data based on pieces of parallax data of the same points on the road, where the pieces of the parallax data have different heights in the parallax image (details will be described later).

The vehicle rear end detection unit 272 detects a rear end part of the vehicle based on the bird's-eye view data. Specifically, the vehicle rear end detection unit 272 extracts a boundary between the fence F and the vehicle based on the bird's-eye view data, and detects the rear end part of the vehicle.

More specifically, the vehicle rear end detection unit 272 generates projection data in a vertical direction (vertical projection data) and projection data in a horizontal direction (horizontal projection data) based on the bird's-eye view data. Thereafter, the vehicle rear end detection unit 272 detects the rear end part of the vehicle based on the horizontal projection data, and detects a starting point (left end) and an ending point (right end) of the vehicle to be cut out based on the vertical projection data. By performing this process, influence of the fence F photographed to be overlapped with the vehicle can be eliminated.

Figure 21:
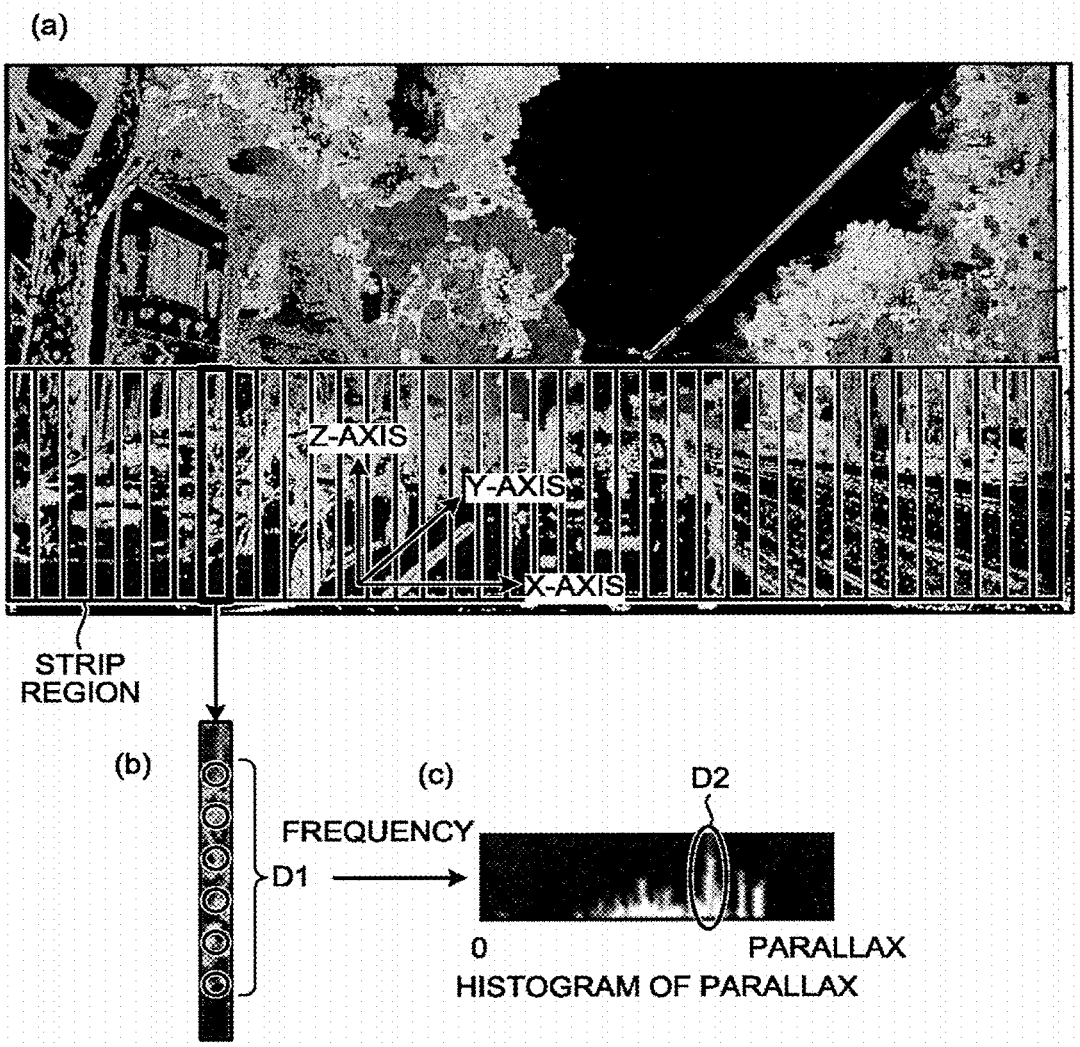
FIG. 21 is an explanatory diagram of a histogram of parallax in the second embodiment.
Figure 22:
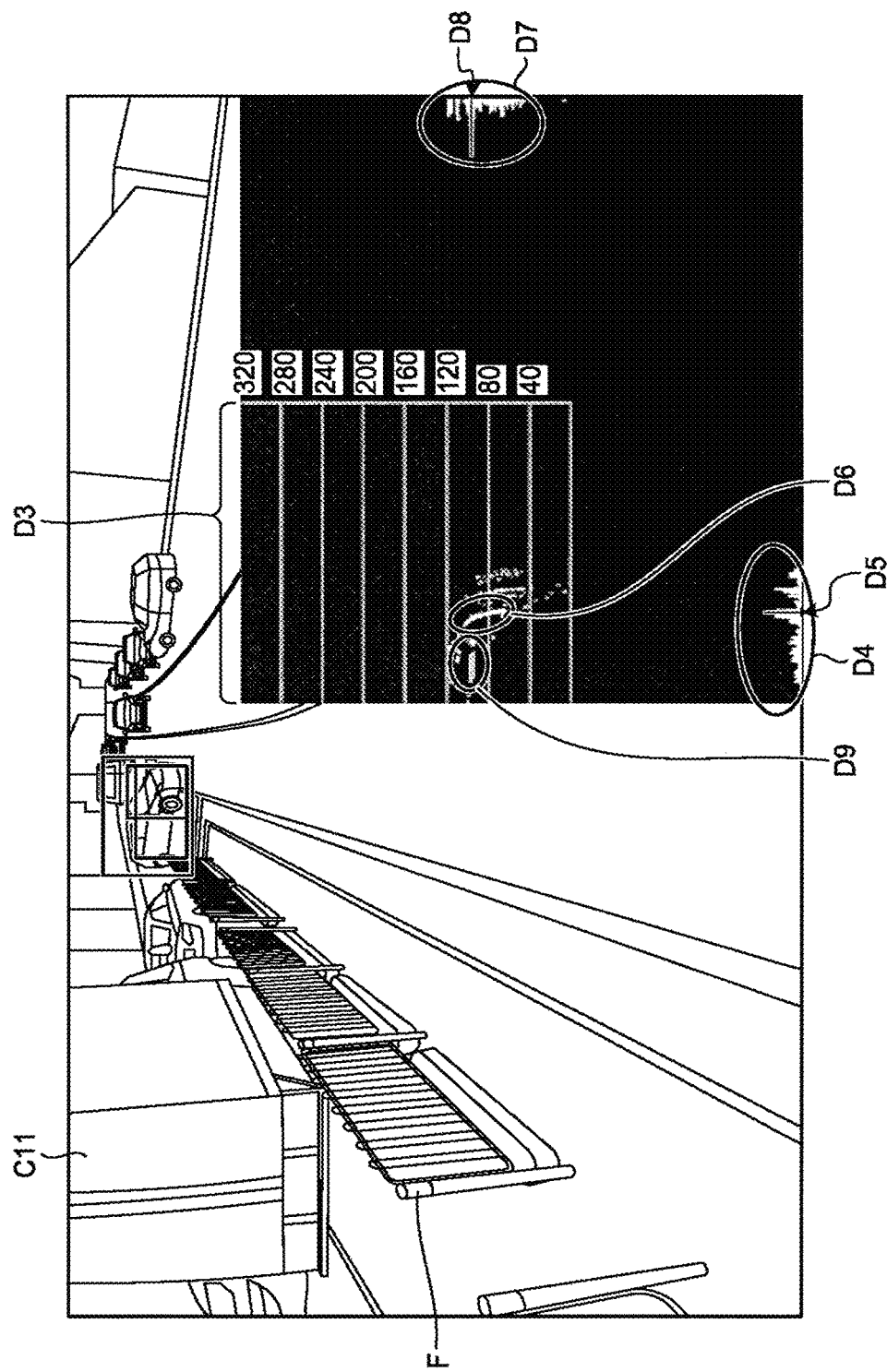
FIG. 22 is an explanatory diagram of processing of separately detecting the fence and a rear end part of a vehicle in the second embodiment.

The following describes processing performed by the bird's-eye view data creation unit 271 and the vehicle rear end detection unit 272 with reference to FIG. 21 and FIG. 22.

FIG. 21 is an explanatory diagram of a histogram of parallax in the second embodiment. In the parallax image illustrated in FIG. 21(a), it is assumed that an X-axis (horizontal direction), a Y-axis (horizontal direction), and a Z-axis (vertical direction) are three-dimensionally set as illustrated in the drawing.

As illustrated in FIG. 21(b), the bird's-eye view data creation unit 271 recognizes each point at which a parallax in space can be calculated (that is, points marked with circles denoted by a reference numeral D1) for a certain strip region. Thereafter, the bird's-eye view data creation unit 271 creates a histogram of parallax for specific points in space in the strip region (FIG. 21(c)). In the specific points, X-coordinates and Y-coordinates are the same, whereas Z-coordinates are different. When a most frequent value (denoted by a reference numeral D2 in FIG. 21(c)) is equal to or larger than a threshold (sixth predetermined value) in the histogram of parallax, the bird's-eye view data creation unit 271 determines the points as being regions having a height at similar distances (hereinafter, referred to as a "region having a height").

FIG. 22 is an explanatory diagram of processing of separately detecting the fence F and the rear end part of the vehicle in the second embodiment. In FIG. 22, a region D3 in a black background region on the lower right indicates the bird's-eye view data (the horizontal direction is a width direction of the road, and the vertical direction is a traveling direction of the road), and a region other than the black background region indicates a schematic diagram of the photographed image.

In the region D3, a portion that is determined to be the region having a height based on the histogram of parallax is represented by a white dot. A white portion in a region D6 corresponds to the fence F. A white portion in a region D9 corresponds to the rear end part of a vehicle C11.

As specific processing, the vehicle rear end detection unit 272 creates horizontal projection data (region D7) based on the bird's-eye view data (region D3). When a peak frequency (D8) of the horizontal projection data (region D7) is equal to or larger than a threshold (seventh predetermined value), the vehicle rear end detection unit 272 determines the data as being the rear end part of the vehicle, and otherwise determines the data as being the fence.

The vehicle rear end detection unit 272 creates vertical projection data (region D4) based on the bird's-eye view data (region D3). When a peak frequency (D5) of the vertical projection data (region D4) is equal to or larger than a threshold (eighth predetermined value), the vehicle rear end detection unit 272 determines the data as being the side surface part of the vehicle, and otherwise determines the data as being the fence.

Figure 23:
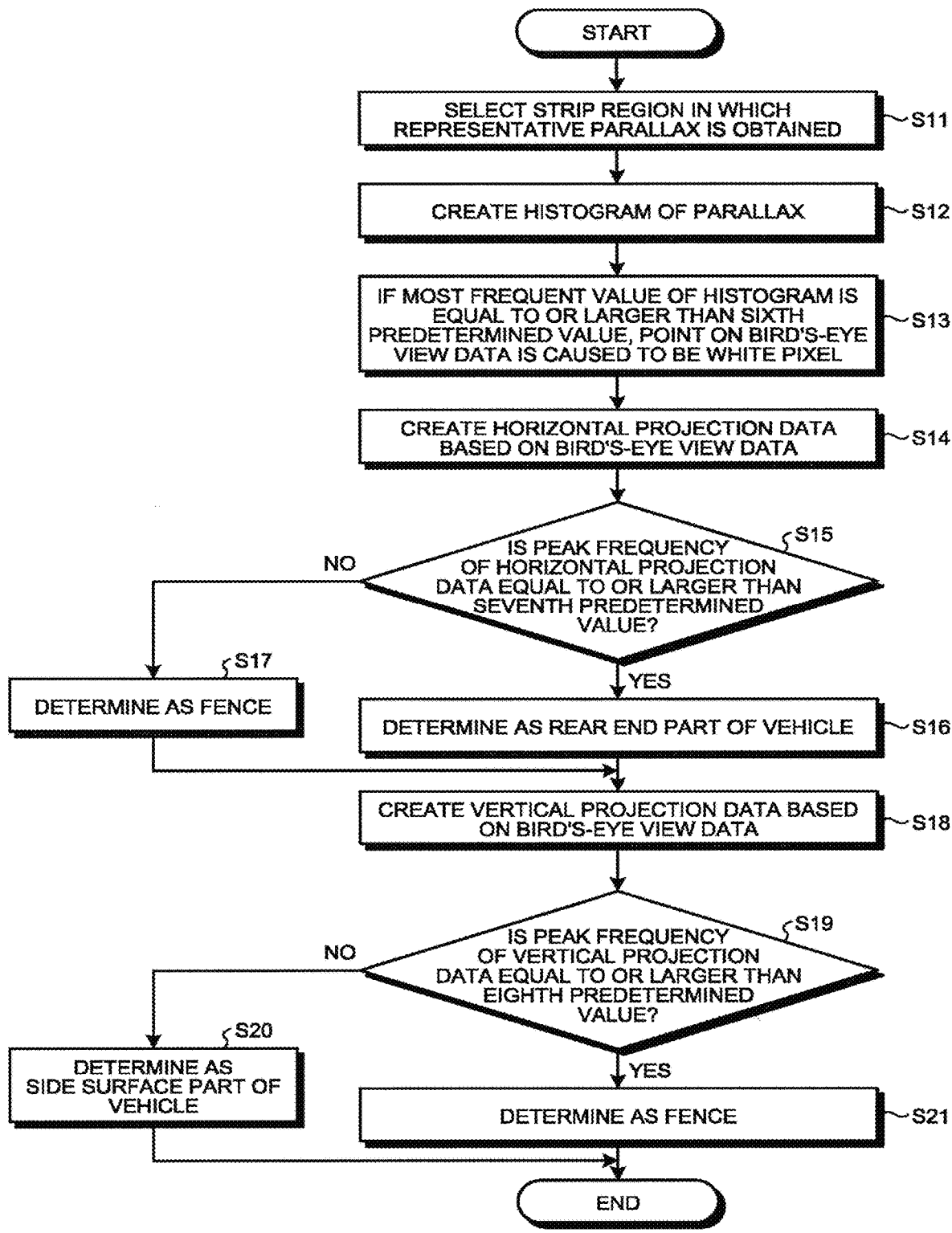
FIG. 23 is a flowchart illustrating processing performed by the vehicle recognition apparatus in the second embodiment.

FIG. 23 is a flowchart illustrating processing performed by the vehicle recognition apparatus 2 in the second embodiment. It is possible to eliminate influence of the fence by performing the processing illustrated in FIG. 23 in addition to the processing illustrated in FIG. 17 by the processing unit 25 of the vehicle recognition apparatus 2.

At Step S11, the bird's-eye view data creation unit 271 selects a strip region in which the representative parallax is obtained. At Step S12, the bird's-eye view data creation unit 271 selects points having the same X-coordinate and the same Y-coordinate, and having different Z-coordinates in the strip region, and creates the histogram of parallax.

At Step S13, when the most frequent value of the histogram of parallax is equal to or larger than the threshold (sixth predetermined value), the bird's-eye view data creation unit 271 determines a point on the bird's-eye view data as being the region having a height, and converts the point into a white pixel.

At Step S14, the vehicle rear end detection unit 272 creates the horizontal projection data (the region D7 in FIG. 22) based on the bird's-eye view data (the region D3 in FIG. 22). At Step S15, the vehicle rear end detection unit 272 determines whether or not the peak frequency (D8 in FIG. 22) of the horizontal projection data (the region D7 in FIG. 22) is equal to or larger than the threshold (seventh predetermined value). In a case of Yes at Step S15, the process proceeds to Step S16. In a case of No at Step S15, the process proceeds to Step S17.

At Step S16, the vehicle rear end detection unit 272 determines the corresponding portion as being the rear end part of the vehicle. At Step S17, the vehicle rear end detection unit 272 determines the corresponding portion as being the fence.

At Step S18, the vehicle rear end detection unit 272 creates the vertical projection data (the region D4 in FIG. 22) based on the bird's-eye view data (the region D3 in FIG. 22). At Step S19, the vehicle rear end detection unit 272 determines whether or not the peak frequency (D5 in FIG. 22) of the vertical projection data (the region D4 in FIG. 22) is equal to or larger than the threshold (eighth predetermined value). In a case of Yes at Step S19, the process proceeds to Step S21. In a case of No at Step S19, the process proceeds to Step S20.

At Step S20, the vehicle rear end detection unit 272 determines the corresponding portion as being the side surface part of the vehicle. At Step S21, the vehicle rear end detection unit 272 determines the corresponding portion as being the fence.

In this way, the vehicle recognition apparatus 2 according to the second embodiment can exhibit an effect of detecting only the vehicle even when the fence and the vehicle are photographed to be overlapped with each other in addition to an effect similar to that of the first embodiment by performing the processing as described above. That is, the vehicle can be detected without influence of the fence.

Although the fence is exemplified in the second embodiment, the embodiment is not limited thereto. Influence of a signboard and the like can be eliminated in the same way.

A vehicle recognition program executed by the vehicle recognition apparatus 2 according to the present embodiments (the first embodiment and the second embodiment) are recorded and provided in a computer-readable recording medium such as a compact disc read only memory (CD-ROM), a flexible disk (FD), a compact disc recordable (CD-R), and a digital versatile disc (DVD), as an installable or executable file.

The vehicle recognition program executed by the vehicle recognition apparatus 2 according to the present embodiments may be stored in a computer connected to a network such as the Internet and provided by being downloaded via the network. The vehicle recognition program executed by the vehicle recognition apparatus 2 according to the present embodiments may be provided or distributed via a network such as the Internet. Furthermore, the vehicle recognition program according to the present embodiments may be embedded and provided in a ROM, for example.

The vehicle recognition program executed by the vehicle recognition apparatus 2 according to the present embodiments has a module configuration including the respective units 251 to 259 in the processing unit 25 described above. As actual hardware, when a CPU (processor) reads out the vehicle recognition program from the storage medium to be executed, the respective units are loaded into a main storage device, and the units 251 to 259, 271, and 272 are generated on the main storage device.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

Specifically, while the present embodiments exemplify a case where the vehicle passes through the left side of the tramcar 1, the present embodiments can also be applied to a case where the vehicle passes through the right side of the tramcar 1.

Furthermore, a moving object equipped with a photographing device that photographs a plurality of vehicles constituting a column of vehicles on a road is not limited to the tramcar 1 described above. For example, such a moving object may be any moving object that moves in parallel with the road, and may be an exclusive bus traveling on an exclusive lane, a monorail train, and the like.

What is claimed is:

1. A vehicle recognition apparatus comprising:
   one or more hardware processors to
      acquire a photographed image obtained by photographing, using a stereo camera, a plurality of vehicles forming a column of vehicles on a road from an obliquely rearward direction with respect to the column of vehicles,
      generate a parallax image based on the photographed image,
      estimate a vanishing point in the parallax image,
      generate a plurality of strip regions by dividing a region below the vanishing point in the parallax image in a horizontal direction,
      calculate a representative parallax for each of the strip regions,
      extract strip regions from which the plurality of vehicles is recognizable, from among the strip regions based on the representative parallax,
      couple strip regions adjacent to each other among the extract strip regions to generate a coupled strip region based on a distance distribution model for a vehicular side and back surfaces, and
      recognize the plurality of vehicles from the coupled strip region.

2. The vehicle recognition apparatus according to claim 1, wherein the one or more hardware processors
   determine, based on a number of the strip regions in the coupled strip region, whether the coupled strip region is a division target,
   calculate top two parallaxes having higher frequency of occurrence in each of the strip regions constituting the coupled strip region that is determined to be the division target,
   calculate a difference in distances based on the top two parallaxes,
   determine, when the calculated difference in distances is included in a predetermined range, a horizontal position in the strip region to be a horizontal position for dividing the coupled strip region into two regions, and divide the coupled strip region into two divided regions based on the determined horizontal position,
   wherein the recognition of one of the plurality of vehicles is performed based on each of the two divided regions.

3. The vehicle recognition apparatus according to claim 1, wherein the one or more hardware processors determine a number of strip regions based on resolution of the parallax image, and divide, based on the determined number, the region below the vanishing point in the parallax image in the horizontal direction to generate the strip regions.

4. The vehicle recognition apparatus according to claim 1, wherein the one or more hardware processors calculate a frequency distribution of parallax having a parallax value equal to or larger than a first predetermined value among parallaxes of respective pixels for each of the strip regions, and set a most frequent value of the frequency distribution as the representative parallax.

5. The vehicle recognition apparatus according to claim 4, wherein the one or more hardware processors extract, from the strip regions in which the representative parallax exists, a cluster of pixels having the representative parallax as the strip region from which one or more of the plurality of vehicles is recognizable.

6. The vehicle recognition apparatus according to claim 4, wherein, when there are two clusters of pixels having the representative parallax and a difference in distances between lower end positions of the respective two clusters is equal to or larger than a second predetermined value, the one or more hardware processors extract a larger cluster of the two clusters as the strip region from which one or more of the plurality of vehicles is recognizable.

7. The vehicle recognition apparatus according to claim 1, wherein the distance distribution model represents that a distance to each point on the vehicular back surface is substantially constant, and that a distance to each point on the vehicular side surface along a traveling direction of the road varies within a predetermined variation rate.

8. The vehicle recognition apparatus according to claim 7, wherein the one or more hardware processors convert the representative parallax of each of the strip regions into a distance based on the distance distribution model, and couple two adjacent strip regions to generate the coupled strip region when a distance of the two adjacent strip regions is equal to or smaller than a third predetermined value.

9. The vehicle recognition apparatus according to claim 2, wherein the one or more hardware processors determine the coupled strip region as the division target when the number of the strip regions in the coupled strip region is equal to or larger than a fourth predetermined value.

10. The vehicle recognition apparatus according to claim 9, wherein the one or more hardware processors calculate a frequency distribution of parallax for each of the strip regions constituting a region on a side on which a side surface of one of the plurality of vehicles is reflected with respect to center in the horizontal direction of the coupled strip region determined as the division target, and calculate the top two parallaxes having higher frequency of occurrence.

11. The vehicle recognition apparatus according to claim 10, wherein, when each frequency of occurrence of each of the top two parallaxes is equal to or larger than a fifth predetermined value, the one or more hardware processors convert the top two parallax into distances, and calculate the difference in the distances.

12. The vehicle recognition apparatus according to claim 11, wherein
   the one or more hardware processors determine whether the calculated difference in distances is included in the predetermined range for each of the strip regions in a direction from the center in the horizontal direction of the coupled strip region determined as the division target toward a side on which the side surface of the vehicle is reflected, and, when the difference in distances is included in the predetermined range, the one or more hardware processors determine the horizontal position in the strip region as the horizontal position for dividing the coupled strip region into two regions.

13. The vehicle recognition apparatus according to claim 1, wherein the one or more hardware processors create, based on the parallax image, bird's-eye view data representing a view of the road from directly above, and detect a rear end part of one of the plurality of vehicles based on the bird's-eye view data.

14. The vehicle recognition apparatus according to claim 13, wherein the one or more hardware processors create the bird's-eye view data based on pieces of parallax data at points same in the horizontal direction of the road and different in height, using the parallax image.

15. The vehicle recognition apparatus according to claim 13, wherein the one or more hardware processors extract a boundary between a fence and the one of the plurality of vehicles based on the bird's-eye view data, and detect the rear end part of the vehicle one of the plurality of vehicles.

16. A vehicle recognition method comprising:

acquiring a photographed image obtained by photographing, using a stereo camera, a plurality of vehicles forming a column of vehicles on a road from an obliquely rearward direction with respect to the column of vehicles;

generating a parallax image based on the photographed image;

estimating a vanishing point in the parallax image;

generating a plurality of strip regions by dividing a region below the vanishing point in the parallax image in a horizontal direction;

calculating a representative parallax for each of the strip regions;

extracting strip regions from which the plurality of vehicles is recognizable, from among the strip regions based on the representative parallax, coupling strip regions adjacent to each other among the extract strip regions to generate a coupled strip region based on a distance distribution model for a vehicular side and back surfaces, and recognizing the plurality of vehicles from the coupled strip region.

17. The vehicle recognition method according to claim 16, further comprising:

determining, based on a number of the strip regions in the coupled strip region, whether the coupled strip region is a division target;

calculating top two parallaxes having higher frequency of occurrence in each of the strip regions constituting the coupled strip region that is determined to be the division target;

calculating a difference in distances based on the top two parallaxes;

determining, when the calculated difference in distances is included in a predetermined range, a horizontal position in the strip region to be a horizontal position for dividing the coupled strip region into two regions; and dividing the coupled strip region into two divided regions based on the determined horizontal position, wherein the recognizing the plurality of vehicles comprises recognizing the plurality of vehicles from each of the two divided regions.

18. The vehicle recognition method according to claim 16, wherein the generating a plurality of strip regions comprises determining a number of strip regions based on resolution of the parallax image, and dividing, based on the determined number, the region below the vanishing point in the parallax image in the horizontal direction to generate the strip regions.

19. The vehicle recognition method according to claim 16, wherein the calculating a representative parallax comprises calculating a frequency distribution of parallax having a parallax value equal to or larger than a first predetermined value among parallaxes of respective pixels for each of the strip regions, and setting a most frequent value of the frequency distribution as the representative parallax.

20. The vehicle recognition method according to claim 19, wherein the extracting strip regions comprises extracting, from the strip regions in which the representative parallax exists, a cluster of pixels having the representative parallax as the strip region from which one or more of the plurality of vehicles is recognizable.

* * * * *